US010082658B2

United States Patent
Constantinou (10) Patent No.: US 10,082,658 B2
(45) Date of Patent: Sep. 25, 2018

(54) HIGH POWER MICROSCOPY ILLUMINATION SYSTEM WITH LIQUID COOLED SOLID STATE LIGHT SOURCE (SSLS) UNIT

(71) Applicant: EXCELITAS CANADA, INC., Vaudreuil-Dorion (CA)

(72) Inventor: Paul Constantinou, Burlington (CA)

(73) Assignee: Excelitas Canada, Inc., Vaudreuil-Dorion (CA)

( * ) Notice: Subject to any disclaimer, the term of this patent is extended or adjusted under 35 U.S.C. 154(b) by 193 days.

(21) Appl. No.: 14/901,474

(22) PCT Filed: Jun. 25, 2014

(86) PCT No.: PCT/US2014/044046
§ 371 (c)(1),
(2) Date: Dec. 28, 2015

(87) PCT Pub. No.: WO2014/210123
PCT Pub. Date: Dec. 31, 2014

(65) Prior Publication Data
US 2016/0370567 A1    Dec. 22, 2016

Related U.S. Application Data

(60) Provisional application No. 61/840,846, filed on Jun. 28, 2013.

(51) Int. Cl.
*G02B 21/06* (2006.01)
*H05B 33/08* (2006.01)
(Continued)

(52) U.S. Cl.
CPC .............. *G02B 21/06* (2013.01); *F21V 15/04* (2013.01); *F21V 29/503* (2015.01); *F21V 29/57* (2015.01);
(Continued)

(58) Field of Classification Search
CPC ....... G02B 21/06; G02B 21/16; F21V 29/503; F21V 29/57; F21V 29/59; F21V 15/04;
(Continued)

(56) References Cited

U.S. PATENT DOCUMENTS 9,632,302 B2 *   4/2017   Jaffe ..................... G02B 27/30
2008/0198448 A1   8/2008   Ganser et al.
(Continued)

FOREIGN PATENT DOCUMENTS

WO    2009033021 A2    3/2009

OTHER PUBLICATIONS

PCT Search Report and Written Opinion for PCT Application No. PCT/US2014/04406, dated Oct. 17, 2014, 7 pages.

*Primary Examiner* — William R Alexander
*Assistant Examiner* — Grant Gagnon
(74) *Attorney, Agent, or Firm* — Peter A. Nieves; Sheehan Phinney Bass & Green PA (57) ABSTRACT

A high power microscopy illumination system is disclosed, having a liquid cooled, Solid State Light Source (SSLS) unit including one or more LED light sources, thermally mounted on a cold plate, which is cooled by a closed-loop liquid cooling system including a remote unit housing a heat exchanger. The SSLS unit with the LED light source is compact and lightweight, and is mechanically and optically directly coupled to the illumination port of the microscope, for efficient optical coupling to the imaging plane. High capacity cooling of the LEDs, enables the LEDs to be driven at higher current densities for increased optical output and for operation with improved thermal stability. The LED driver circuitry may also be housed within the SSLS unit and liquid cooled. The SSLS unit is vibrationally isolated from (Continued)

vibration-causing components of the cooling system, such as cooling fans and other bulky components, which are housed in the remote unit.

18 Claims, 8 Drawing Sheets

(51) Int. Cl.
    *F21V 29/58*     (2015.01)
    *F21V 15/04*     (2006.01)
    *F21V 29/503*     (2015.01)
    *F21V 29/57*     (2015.01)
    *G02B 21/16*     (2006.01)
    *F21Y 115/10*     (2016.01)

(52) U.S. Cl.
    CPC .............. *F21V 29/59* (2015.01); *G02B 21/16* (2013.01); *H05B 33/089* (2013.01); *H05B 33/0845* (2013.01); *F21Y 2115/10* (2016.08)

(58) Field of Classification Search
    CPC ............ F21Y 2115/10; H05B 33/0845; H05B 33/089
    USPC .......................................................... 359/390
    See application file for complete search history.

(56) References Cited

U.S. PATENT DOCUMENTS

| | | |
|---|---|---|
| 2010/0038660 A1 | 2/2010 | Shuja |
| 2011/0043092 A1 | 2/2011 | Shuja et al. |
| 2014/0160559 A1* | 6/2014 | Mermelstein .......... G02B 21/16 |
| | | 359/385 |
| 2016/0370567 A1* | 12/2016 | Constantinou .......... F21V 29/59 |

* cited by examiner

Liquid cooled SSSL Unit
or System "Head"
FIG. 8B

HIGH POWER MICROSCOPY ILLUMINATION SYSTEM WITH LIQUID COOLED SOLID STATE LIGHT SOURCE (SSLS) UNIT

CROSS REFERENCE TO RELATED APPLICATIONS

This application is a national phase application pursuant to 35 U.S.C. 371 of International Application No. PCT/US2014/044046, filed Jun. 25, 2014, which claims priority to U.S. Provisional Application No. 61/840,846, filed Jun. 28, 2013. These applications are hereby incorporated by reference in their entireties.

FIELD OF THE INVENTION

This invention relates to high power illumination systems for microscopy applications, such as fluorescence imaging and analysis, and particularly relates to microscope illuminators having solid state light sources.

BACKGROUND OF THE INVENTION

Traditionally, microscope illumination systems have used discharge lamps, such as bulbs containing mercury (Hg), xenon (Xe), or a metal halide mixture. These lamps produce intense light from a small source volume, and thus can be coupled efficiently to the optical path of a microscope. However, these lamps have relatively short lifetimes, for example as little as 100 hours for Hg lamps and up to 2,000 hours for metal halide lamps, which is a significant drawback. In addition, because the lamps require a warm-up period to stabilize, these lamps are usually operated continuously while control of light intensity is achieved through opto-mechanical means, such as a mechanical shutter, filter wheel, and/or attenuator.

In a typical experiment it is desirable to illuminate the sample only when data is being acquired. For example, data may be acquired during a 100 ms exposure every 5-10 minutes to observe the growth of cells over the period of a few days. Between exposures, the sample is not illuminated, for example to reduce phototoxic effects that can impact cell viability. Turning a discharge lamp on and off on these time scales significantly degrades the lifetime of the lamp. For this reason, the lamp remains on during an experiment and light intensity on the sample is controlled opto-mechanically. A significant portion of the light generated is therefore considered to be wasted energy.

Solid State Light Sources (SSLS), such as Light Emitting Diodes (LEDs), can offer a solution to this problem since they can be controlled electronically, for example turned on and off rapidly, as well as electronically dimmed by adjusting the current flowing through the device to control intensity. Under typical operational conditions, the lifetime of available LED light sources can approach 20,000-50,000 hours. This means that not only is the operational lifetime of an LED light source significantly longer than a lamp system, it is possible to turn the source off when illumination is not required, without significantly degrading the lifetime. Thus, virtually all of the light produced by an LED light source can be used for data collection/observation. The extended lifetime of such a system is potentially orders of magnitude longer than a conventional lamp based microscope illumination system. For this reason, there has been significant interest in producing microscope illuminators using LED technology.

However, in view of the different characteristics of solid state light sources compared with discharge lamps, LEDs have some drawbacks that have hindered widespread adoption for microscopy applications. For example, LED light sources have limited power output, spectral range and reduced coupling efficiency compared to discharge lamps. Also, the lifetime, optical efficiency and stability of the output optical power of LED light sources are temperature dependent.

Figure 1:
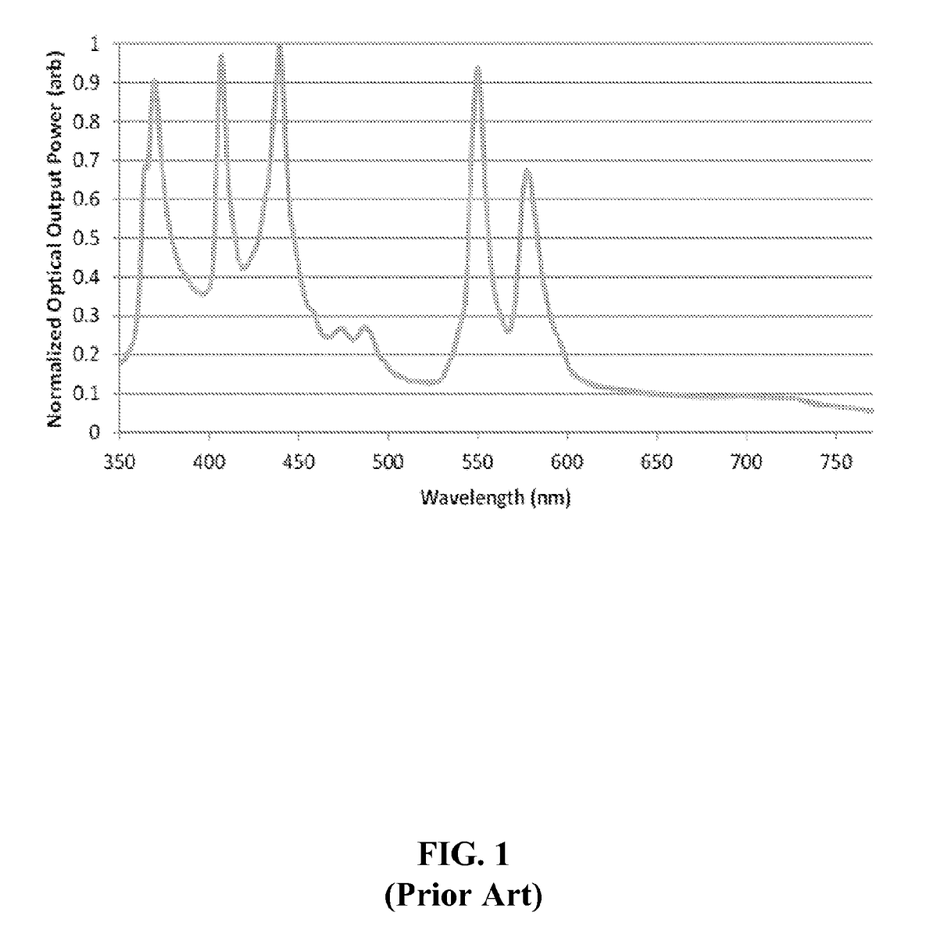
FIG. 1 is a graph showing an exemplary emission spectrum from a microscope illumination system including a prior art metal halide lamp.

Conventional lamp technology can provide high intensity light sources with broadband emission, and strong emission at wavelengths in the ultraviolet (UV), visible and infrared (IR) ranges. As an example, for a typical fluorescence microscope illumination system the spectral content of the source is typically required to be broadband, such as covering the range from the ultraviolet (UV) to the visible wavelengths, for example from about 350 nm to 700 nm. Metal halide or mercury arc lamps produce a broad spectrum of illumination with a number of discrete strong emission peaks throughout the UV and visible range, for example, as illustrated by the emission spectrum shown FIG. 1 for a metal halide lamp. FIG. 1 plots normalized output power (arb) against wavelength (nm) for a typical emission spectrum from a metal halide lamp for a microscope illumination system.

Figure 2:
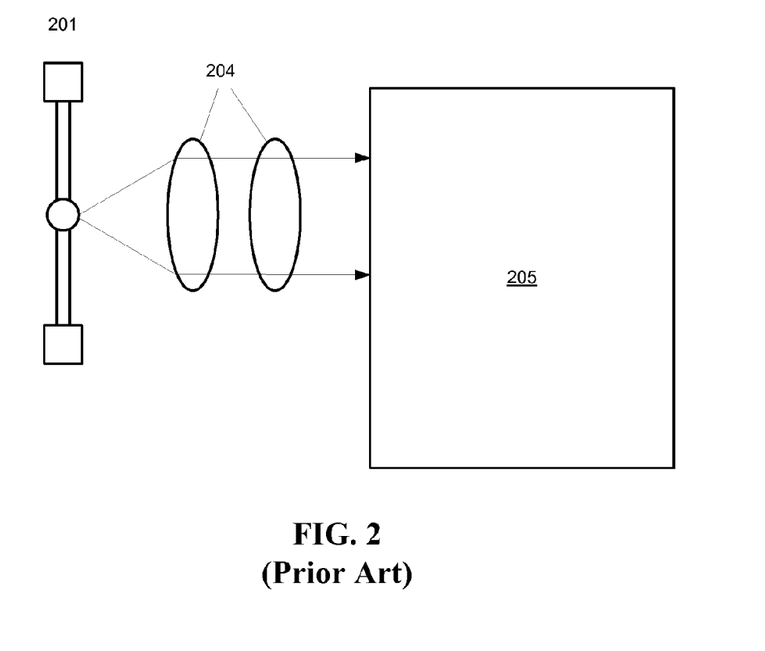
FIG. 2 is a schematic diagram illustrating a prior art schematically direct coupling of a microscope illumination system including a metal halide lamp to an optical input port of a microscope.
Figure 3:
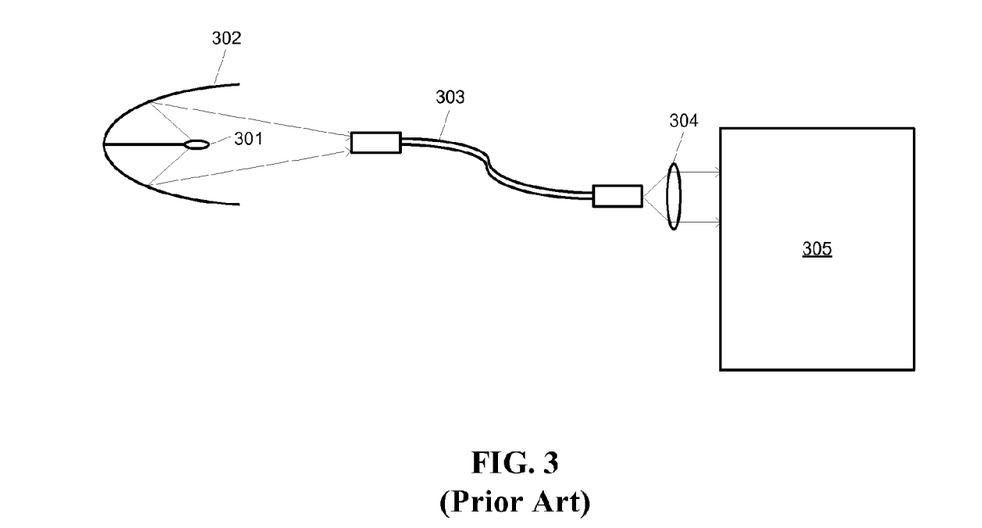
FIG. 3 is a schematic diagram illustrating a prior art schematically a liquid light guide or fiber light guide coupling of a microscope illumination system including a metal halide lamp to an optical input port of a microscope.

The high power optical output and compact size of the filament and configuration of a traditional lamp assembly enables very effective coupling of optical energy to the focal plane of a microscope, either directly, using optical components such as lenses, or by remote coupling using a light guide, such as a liquid light guide (LLG) or fiber bundle. FIG. 2 shows a simplified schematic illustrating a typical example of a system configuration for a directly coupled illumination system. A Hg lamp 201 is directly coupled to a microscope 205 or imaging system via collimating optics 204. FIG. 3 shows a simplified schematic illustrating a typical example of a system configuration for a remotely coupled system via LLG or fiber bundle. A metal halide lamp 301 produces a high intensity light beam that is reflected by a reflector 302 into an ingress end of a waveguide 303, for example, a liquid light guide or fiber optic bundle. The beam emerges from an egress end of the waveguide 303, and passes through collimating optics 304 into a microscope 305 or imaging system.

If needed, a high power lamp may be actively cooled, for example, using forced air from a fan, and/or a light guide may be used for optical coupling to provide for thermal separation of the lamp from the optical port of the microscope. Typically a mercury (Hg) lamp, does not require active cooling fans, and can be directly optically coupled to the illumination port of a microscope. However, this type of lamp suffers from a short lifetime (100-300 hours). A metal halide lamp has a longer lifetime, but requires an active cooling system (fans). Thus, a mercury lamp is not ideal for direct coupling, since fan vibrations may be transmitted to the microscope. If active cooling is used, light guide coupling can assist in providing isolation from vibrations caused by the cooling fans in the lamp housing. Even though a light guide results in some attenuation, typically 20% to 30% (transmission of about 70% to 80% of input light), conventional high power lamp systems can still provide sufficient optical output for microscopy applications. Nevertheless, light guides do degrade over time and need frequent replacement, for example every 2000 hours to maintain good transmission efficiency.

In comparison with conventional lamp technology, LEDs are inherently narrow-band optical devices and the emission spectrum from an individual LED is typically only 30-50 nm wide. Thus, an LED light source may include an LED with a phosphor layer to generate a broader emission band by wavelength conversion. To simulate or approximate a broadband source, such as a conventional discharge lamp, multiple LED light sources, typically three or more LED light sources emitting different wavelength bands are combined. Such an arrangement requires additional optical elements such as lenses, beam combiners or dichroic beam splitters, to combine emission from multiple sources onto the same light path or optical axis.

The lifetime, optical efficiency and stability of the output optical power of LED light sources are temperature dependent. In practice, active thermal management is needed to provide temperature control to enable use of LED light sources for microscopy applications, such as fluorescence imaging and analysis, for example particularly where precise intensity control is needed for quantitative studies.

Figure 4:
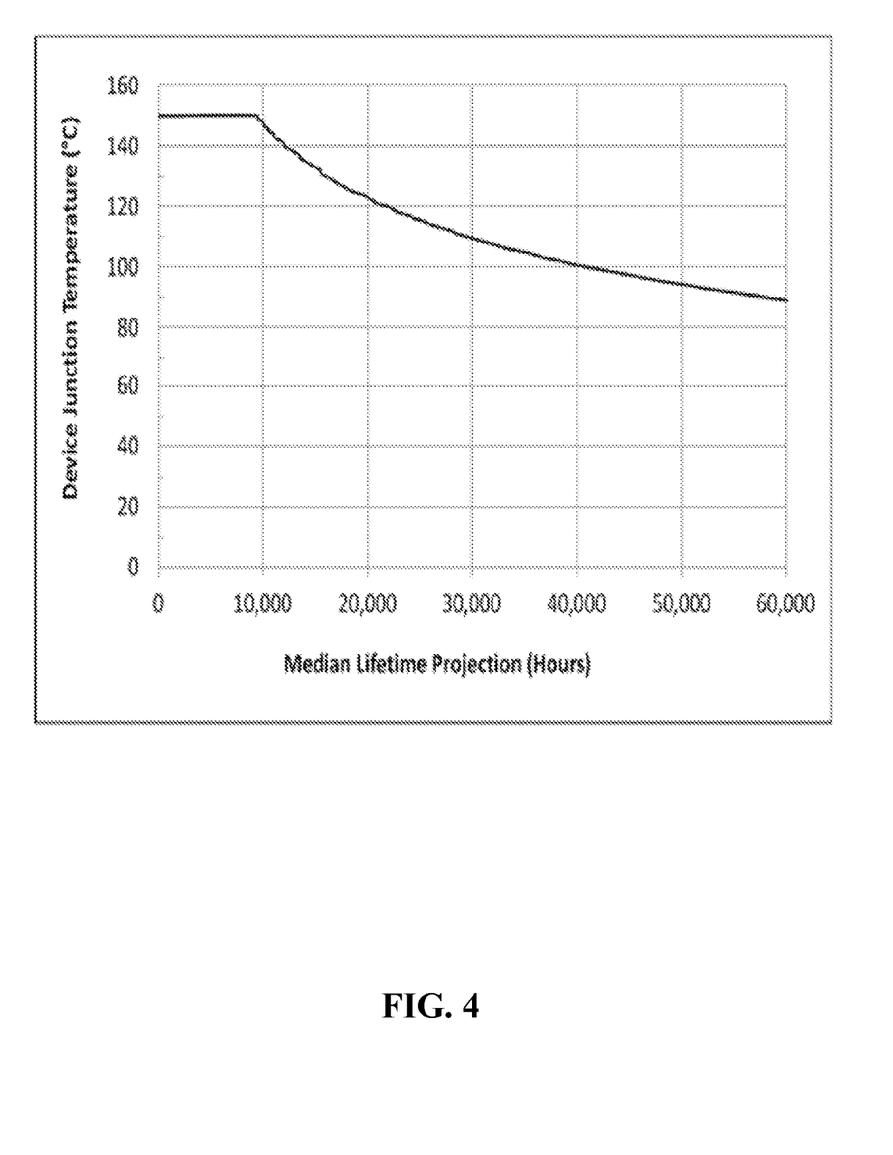
FIG. 4 shows a graph illustrating the dependence of the projected lifetime of a typical LED vs. the junction temperature of the LED.

While significant improvements have been made to LED electro-optic efficiency in recent years, for the optical energy from an LED light source to meet or exceed the levels from a lamp, the LED must be driven at very high current density levels, that is, "overdriven" at current density levels which are higher than most LED manufacturers recommend running their products. Typical manufacturers' specifications for LED current density are approximately 0.5 A/mm$^2$ to 1 A/mm$^2$. To provide optical output which is competitive with a discharge lamp, typically a current density of 1.5 A/mm$^2$ to 2 A/mm$^2$, or greater, is required. At these levels, the heat flux generated by the LED is quite high, typically 5 W/mm$^2$ to 10 W/mm$^2$, or more. Therefore, to maintain the lifetime and optical stability of the LED at high current density, the heat must be dissipated by an efficient heat transfer mechanism. At the LED junction, where light is produced, there is a correlation between the junction temperature ($T_j$) and the lifetime of the device. For example, for a typical LED, as shown in FIG. 4, to maintain a lifetime approaching 50,000 hours the LED junction must be maintained at approximately 95° C., or less.

The output power and power stability of the LED are also directly related to the junction temperature ($T_j$). As the LED heats up its electro-optical efficiency changes slightly and less power is converted into optical energy. The visible effect is that, when an LED is initially turned on, the power spikes to a maximum, then as the system stabilizes thermally, and the optical power drops slightly until a point of equilibrium is reached, as shown, for example, in FIG. 5. This effect can be an issue for microscopy applications, since quantitative studies often depend on tracking changes in image intensity. Typically, intensity control is required within better than 5%, and ideally better than 1%, otherwise analysis of experimental results can become very challenging. Therefore, a large heat sink and fan is required for thermal management, and/or the current density must be limited, to maintain an acceptable operating temperature.

In optical system design, it is usually desirable to minimize the number of components in the optical train between the light source and the focal plane of the microscope. Thus, the most efficient optical arrangement is to directly attach the LED illumination system to the microscope frame. However, when a large heat sink and fan are needed to cool the assembly for operation at high current densities, the additional weight and bulk of the system poses a problem.

Microscopes are not designed to carry a large bulky mass on their illumination ports. Moreover, active cooling, such as using a cooling fan, can cause vibrations that degrade image quality significantly when using high magnification microscope objectives (40× and greater). For this reason, many manufacturers have opted to deliver light to a microscope through a Liquid Light Guide (LLG) or fiber bundle, thus decoupling the source of vibrations from the light source.

Figure 5:
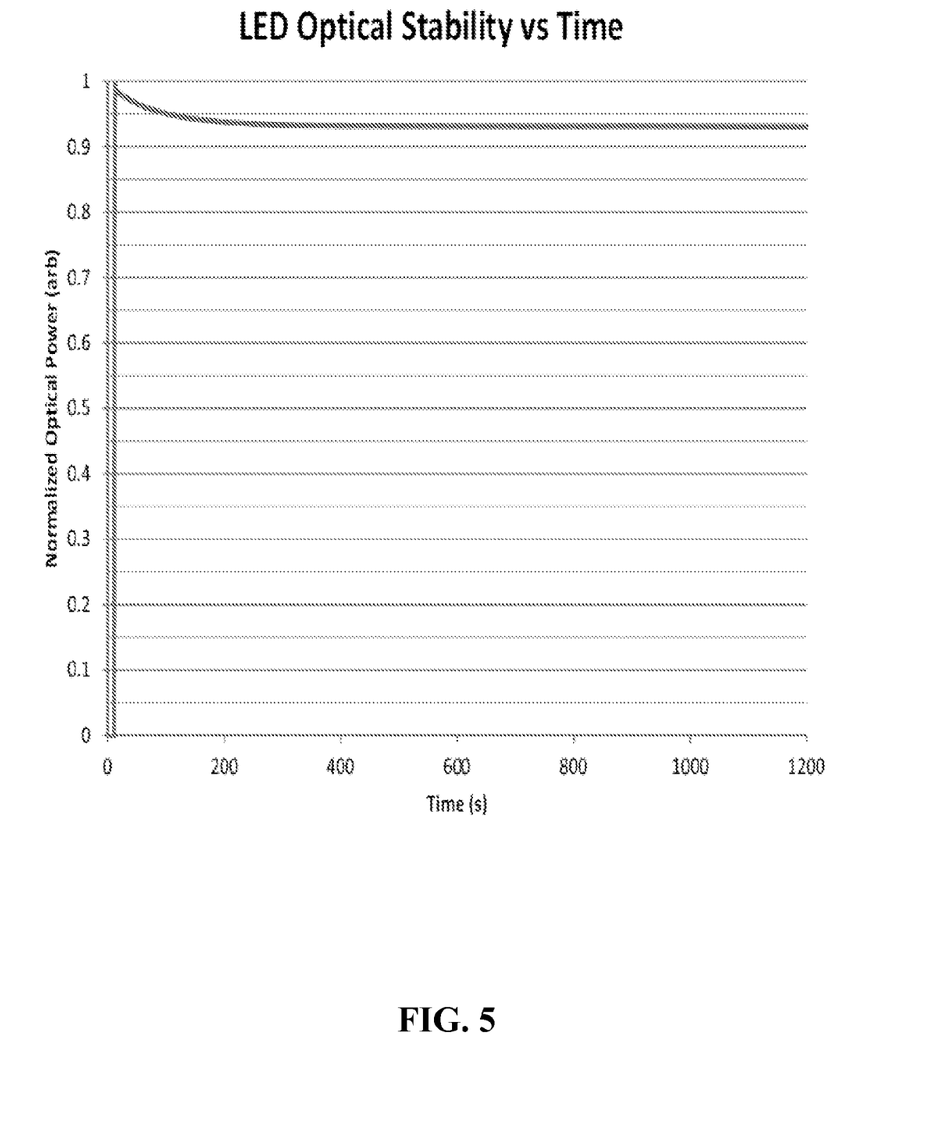

By way of example only, the following references disclose some known arrangements for microscope illumination systems, such as, those referred to above. U.S. Pat. No. 7,130,507 discloses an example of a light source unit for a microscope illumination system with coupling of a lamp to the microscope through a liquid light guide such as illustrated in FIG. 5. U.S. Pat. No. 6,154,282 discloses an example of an illumination system using an LED light source for fluorescence and phosphorescence excitation in a microscope. This LED light source includes a plurality of discrete LED sources, emitting different wavelengths for selectively exciting contrast agents in a specimen under observation. U.S. Pat. No. 7,832,894 discloses a broadband LED light source which uses an array of spatially arranged LEDs directly coupled to the microscope to produce a desired illumination pattern on a sample. U.S. Pat. No. 7,903,328, U.S. Pat. No. 6,392,795, and U.S. Pat. No. 6,567,212 highlight the need for vibration dampening systems for microscopes to ensure that extraneous vibrations, for example as caused by motion controllers, cooling fans or other sources, do not adversely affect image quality.

In summary, LED light sources offer advantages with respect to electronic control and extended lifetime compared to discharge lamps. However, for broadband illumination, multiple LEDs may be required, resulting in multi-component mechanical and optical coupling systems. Moreover, to provide high optical output power, comparable to that of a discharge lamp, LED light sources must be overdriven at high current density, necessitating high capacity thermal management using heavy and bulky active cooling systems, such as fans. The latter cause unacceptable vibrations when the light source assembly is directly coupled to a microscope illumination port.

Thus, there is a need for improved or alternative microscopy illumination systems based on solid state light sources that address one or more of the above mentioned problems.

SUMMARY OF THE INVENTION

Embodiments of the present invention provide a high power microscopy illumination system with a liquid cooled solid state light source unit. The embodiments seek to overcome or mitigate one or more disadvantages of known illumination systems for microscopy, fluorescence imaging and analysis, or at least provide an alternative.

Thus, one aspect of the present invention provides a high power microscopy illumination system having:

a liquid cooled solid state light source (SSLS) unit for direct coupling, i.e. mechanical and optical coupling, to an illuminator port of the microscope, the SSLS unit including an LED light source thermally coupled to a liquid cooled thermal plate/block of a closed loop liquid cooling system and optical elements for direct optical coupling of optical emission from the LED along an optical axis to an optical aperture of the illuminator port;

an electronic controller including an LED driver electrically connected to the LED light source for driving the LED light source; a unit remote from the SSLS unit including a heat exchanger of the closed loop liquid cooling system;

liquid coolant couplings between the heat exchanger and the liquid cooled thermal plate forming a closed loop for circulation of liquid coolant and pump means for circulating coolant liquid in the closed loop; and the SSLS unit being vibrationally isolated from the remote unit.

This arrangement provides for efficient direct mechanical and optical coupling of the liquid cooled SSLS unit to the microscope illumination port for high brightness illumination with high thermal capacity cooling. For example, the housing of the SSLS unit may be coupled to the illuminator port of the microscope using a standard adaptor flange. Efficient cooling of the LED light source allows for use of a high current LED driver that provides for an LED to be driven at higher current, for example overdriven at over 1 $A/mm^2$, to provide high brightness, high power optical output. The active cooling components that create vibration or noise, such as cooling fans of the heat exchanger in the remote unit, are separated from and vibrationally isolated from the liquid cooled SSLS unit. For example, any liquid coolant couplings, such as tubing, and/or electrical connections to the SSLS unit are sufficiently flexible, so as to dampen any vibrations from the remote unit caused by the cooling fans for the heat exchanger or the electronic LED controller, so that these vibrations are not transmitted through the SSLS unit to the microscope. Moreover, this arrangement means that the weight and bulk of the cooling components and electronics is separated from the SSLS unit. The SSLS unit can be provided within a compact housing that directly connects to the illuminator port using a standard microscope coupling. The SSLS unit, or light engine "head", is thus relatively lightweight, compact, and efficiently cooled, while being vibrationally isolated from other components of the cooling system. The liquid cooled SSLS unit may thus be directly mounted on a standard microscope illumination port, without need for modifications or additional support structures.

The SSLS unit may include a single LED light source, such as an individual LED or an LED array. The LED light source may be a phosphor LED for generation of a broader emission by wavelength conversion. For broadband illumination, the SSLS unit may include multiple LED light sources emitting different wavelength bands together with optical elements to couple emission from each LED light source to a common optical axis.

In one embodiment, the controller including the LED driver or drivers may be housed in the remote unit with the heat exchanger. Thus the heat exchanger fans may be used for cooling the electronics of the controller.

In another embodiment, the LED driver circuitry is located within the SSLS unit with the LED light source. For overdriven LEDs, this provides an advantage since the high current electrical connection between the LED driver and LED light source is shorter. In this arrangement, the LED driver may also be liquid cooled, for example mounted on the same cold plate at the LED light source or mounted on its own liquid cooled plate on the liquid cooling loop.

While the pump is preferably remote from the liquid cooled SSLS unit, since the vibration created by the pump is minimal compared to that from the cooling fans, the pump and a coolant reservoir may be located in the SSLS unit.

The controller may be configured for driving the LED light source over a wide range of current densities, e.g. in the range from 0.02 $A/mm^2$ to greater than 2 $A/mm^2$, while the liquid cooling system provides cooling capacity for maintaining an operational temperature (junction temperature) of the LED light source at or below 95° C., for extended lifetime operation, and for maintaining stability of the optical power output within ±1%.

A microscope illumination system according to preferred embodiments of the invention, has the potential of meeting and exceeding the output of the best lamp-based systems available today for microscopy, such as microscope illuminators providing particular wavelengths used for fluorescence microscopy, imaging and analysis, while overcoming at least some of the limitations of existing high brightness LED light sources.

The resulting high power microscope illumination system using a liquid cooled SSLS unit provides a significant performance improvement over traditional lamp sources for applications such as those that require only periodic illumination of biological specimens. A vibration-free SSLS unit can be directly coupled to a microscope illuminator port or to an optical port of, for example, a fluorescence imaging and analysis system, allowing for more efficient direct optical coupling of light to the imaging plane of the system, avoiding the need for liquid light guides that degrade over time. In addition, the high capacity cooling system allows for the LED light source to be over driven at higher current densities, while maintaining the long lifetime and other operational characteristics that end users have come to expect from LED sources.

The foregoing and other objects, features, aspects and advantages of the present invention will become more apparent from the following detailed description, taken in conjunction with the accompanying drawings, of preferred embodiments of the invention, which description is by way of example only.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

FIG. 5 shows a graph illustrating the output power of a typical LED as a function of time after the device is turned on.

FIGS. 8A and 8B illustrate schematically a microscopy illumination system according to a third embodiment.

DETAILED DESCRIPTION

Reference will now be made in detail to embodiments of the present invention, examples of which are illustrated in the accompanying drawings. Wherever possible, the same reference numbers are used in the drawings and the description to refer to the same or like parts.

Figure 6:
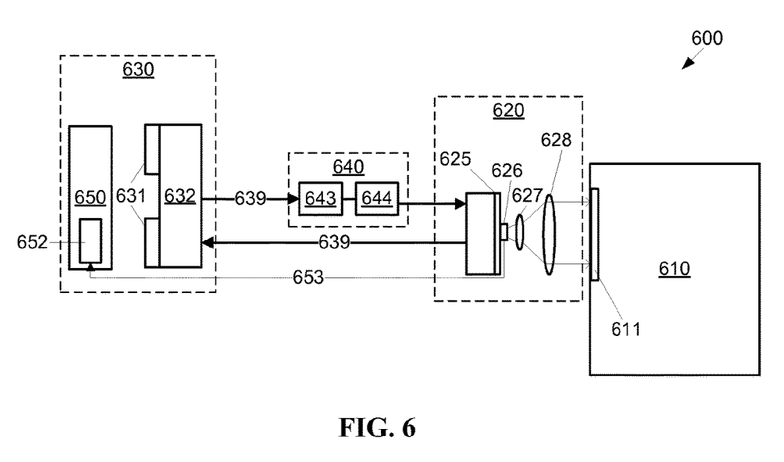
FIG. 6 is a schematic diagram that illustrates a microscopy illumination system according to a first embodiment of the invention.

A schematic diagram showing elements of an illumination system 600 for a microscope 610, according to a first exemplary embodiment of the invention, is shown in FIG. 6.

The system 600 includes a liquid cooled solid state light source (SSLS) unit 620 having an LED light source 626 that is thermally coupled to a liquid cooled plate 625 or cold plate, which is part of a closed-loop liquid cooling system. Optical elements including lenses 627 and 628 directly couple the optical emission of the LED light source 626 to the optical input 611 of the microscope 610. That is, the SSLS unit 620 is mechanically attached to and supported by the illuminator port 612 of the microscope 610, for example by a microscope adapter flange (not shown).

Another unit 630 remote from the SSLS unit 620 includes a heat exchanger 632 for the closed loop liquid cooling system. The heat exchanger 632 includes one or more cooling fans 631. The cooling system includes flexible tubing 639 forming a coolant loop through which coolant liquid is fed via pump unit 640 to a cold plate 625 and then returns coolant liquid via tubing 639 to the heat exchanger 632. The pump unit 640 includes a liquid reservoir 643 and a low power pump 644. The remote unit 630 also contains an LED controller 650, including an LED driver 652 with electrical connections 653 to the LED light source 626 for driving the LED. Preferably the LED driver 652 is a high current driver for overdriving the LED at high current density, to provide high power and high brightness emission. The liquid coupling, such as the tubing 639, and electrical connections between the remote unit 630 and the SSLS unit 620 are sufficiently long and flexible to provide vibration isolation between the remote unit 630 and SSLS unit 620. For example, the electrical and liquid couplings between the remote unit and the SSLS unit 620 may be about 1.5 m to 2 m long.

As illustrated in FIG. 6, when the LED light source 626 has a single LED or LED array, direct and efficient optical coupling of the light emission may be provided by a simple arrangement of minimal number of optical coupling elements, such as lenses 627 and 628. The relatively large area of the emitter area of an LED light source 626 relative to the size of the filament of a discharge lamp somewhat relaxes the need for precise positioning and optical alignment of the light source 626 to the optical path 611 of the microscope 610 for optimum coupling. For improved uniformity of illumination at the objective plane of the microscope 610, the optical coupling elements may include a diffuser (not shown).

Thus, the first embodiment illumination system 600 utilizes an efficient liquid cooling system in an arrangement that introduces substantially no additional vibration into the frame of the microscope 610 and that also has sufficient thermal capacity to allow the LED light source 626 to be overdriven at high current density. This arrangement offers several advantages. First little or no vibration is coupled into the microscope 610 frame from active cooling components 630, for example fans 631 of the heat exchanger 632. Second, a compact and lightweight SSLS unit 620 allows the unit to be attached directly to the optical illuminator port 611 of the microscope 610, for example using a standard adapter flange (not shown). Third, direct optical coupling allows for higher power to be delivered to the microscope 610 objective plane than remote LED light sources that are LLG or FLG coupled, since typically there is a 20% to 30% loss in the light guide, and the performance of light guides, LLGs in particular, degrade over time and so they must be periodically replaced.

High thermal capacity cooling enables a lower operating temperature of the LED at high current to provide more stable light output vs. known microscope illumination systems using air cooled LED light sources and lamps.

As shown schematically in FIG. 6, the cooling fans 631 of the heat exchanger 632 in the remote unit 630 are the main sources of vibration in the system. However, the remote unit 630 is separated from the microscope 610 by the flexible heat transfer fluid tubing 639 which provides vibration isolation. The pump unit 640 includes a coolant reservoir 643, which allows for replacement of any coolant fluid loss over time, and a pump 644 that circulates the heat transfer fluid (coolant) through the closed-loop cooling system 639. A low flow of liquid coolant provides more effective cooling of the LED light source 626 compared to forced air cooling. Thus, in alternative arrangements, the pump elements 640 may be contained in the remote unit 630 or within the SSLS unit 620, since a low flow fluid pump introduces virtually no vibration or noise as compared with a large cooling fan.

The LED light source 626 may be cooled sufficiently to maintain a suitable operational temperature for improved thermo-optical stability over time. For example, the light source 626 may be maintained at a temperature below a threshold value, for example, of 95° C., for extended lifetime. Temperature control also provides for more stable optical output power for applications where precise control of intensity is required, such as for quantitative fluorescence imaging studies.

While liquid cooling provides more efficient cooling than forced air, it is desirable to avoid chilling or overcooling the components below the ambient temperature, to the point that problems, such as moisture condensation, would occur. Thus the system 600 provides only a low volume flow of coolant. Suitable coolant fluids may include, for example, water or other non-hazardous aqueous coolants, such as a water/glycol mixture to reduce risk of freezing during shipping or storage.

In a simple control system, the cooling system may be activated as needed when the light source is turned on, and the pump and fans may be run only as required to keep the temperature of the light source below the threshold. Non continuous operation increases the lifetime of the fans and pump as well as reduces any acoustic noise they generate when the light source is not active.

The LED controller 650 including the LED driver electronics 652 may be contained within the remote unit 630, as illustrated in FIG. 6, in which case the fans 631 may be used for cooling of the controller 650 electronics.

Alternatively, the controller 650 electronics may have a separate housing. Preferably, when the LED is overdriven at high current density, the LED controller 650 electronics are also air cooled or coupled to the liquid cooling loop 639 to provide efficient cooling of the driver electronics when operated at high current.

For example, in a preferred arrangement, the LED driver circuitry 652 of the controller may be located in close proximity to the LED light source 626 within the SSLS unit 620. In this arrangement, an LED driver 652 electronics may also be liquid cooled, for example thermally coupled to a cooling plate which is part of the liquid cooling loop, within the SSLS unit 620.

Figure 7:
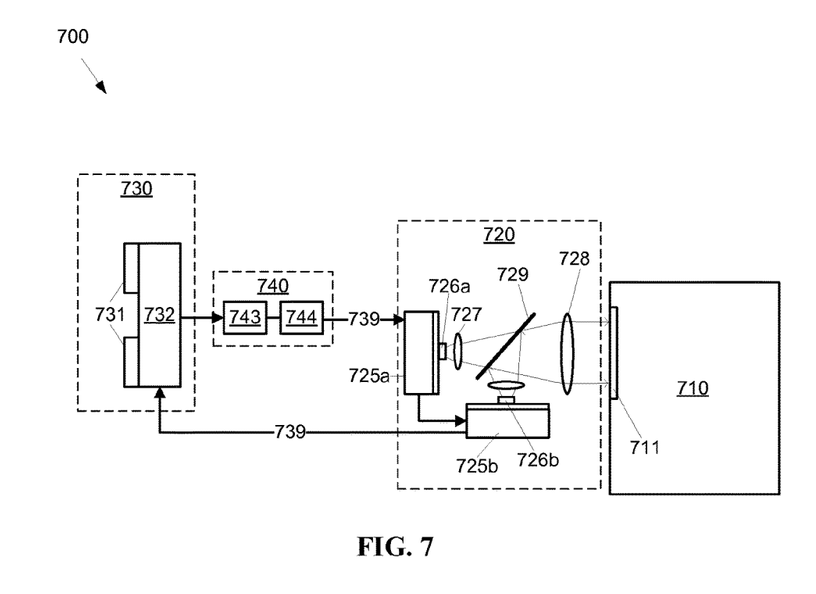
FIG. 7 illustrates schematically a microscopy illumination system according to a second embodiment.

A microscope illumination system 700, according to a second embodiment of the invention, is illustrated schematically in FIG. 7. In this embodiment, a liquid cooled SSLS unit 720 includes a plurality of LED light sources, as illustrated in FIG. 7, two LED light sources 726a and 726b, each thermally coupled to a respective cold plate 725a and 725b. Other arrangements having a different number of LED light sources are possible. Both cold plates 725a, 725b may be fed in series with liquid coolant by a closed loop liquid cooling system 739. When the cold plates 725a, 725b are fed in series, the loop 739 is preferably arranged so that a cooler device is fed first in the cooling loop 739. For example, the first LED light source 726a may be operated at a lower power, for example 10 Watts, while the second LED light source 762b is a device which is overdriven at high current density, to produce a higher power output, for example 100 Watts. Other components of the system 700 are similar to those shown in FIG. 6.

As will be appreciated, when the liquid cooled SSLS unit 720 houses multiple LED light sources 726a, 726b, these LED light sources 726a, 726b may each be thermally coupled to individual cold plates 725a, 725b, or more than one LED light source 726a, 726b may be mounted on a common cooling block (not shown). The cooling plates 725a, 725b or blocks may be coupled into the same cooling loop 639 in series or in parallel.

As illustrated, suitable optical coupling elements, such as a dichroic beam-splitter 729 and coupling lenses 727 and 728, are used to couple the optical emission from each LED light source 726a, 726b, along a common optical axis, to the optical output. Thus, several LED light sources 726a, 726b may be provided for different wavelength ranges of illumination. The output of the light source 720 unit is coupled to the illumination port 711 of the microscope 710, for example, using a standard microscope adapter flange (not shown).

For simplicity, the LED controller 650 (FIG. 6) and LED drivers 652 (FIG. 6) for each LED light source 726a, 726b are not shown in FIG. 7: these components may be contained in the housing of the remote unit 730, for example in the enclosure housing the cooling fans and heat exchanger, as illustrated schematically in FIG. 6. In this case, the LED drivers can be cooled with the same airflow from the fans, and as shown in FIG. 6, electrical connections 653 (FIG. 6) from the LED drivers 652 (FIG. 6) would be provided to each LED 726a and 726b. Alternatively, the LED drivers 652 (FIG. 6) may reside in the SSLS unit 720 or "light engine head" and are also mounted on a cooling plate 725a, 725b or block which is coupled into the liquid cooling loop 739. For high current operation, such as when overdriving one or more of the LED light sources 726a, 726b, the latter configuration enables shorter electrical connections for carrying high current between the LED drivers 652 (FIG. 6) and the LED light sources 726a, 726b while providing efficient cooling of the control 650 (FIG. 6) and driver 652 (FIG. 6) electronics.

Figures 8A, 8B:
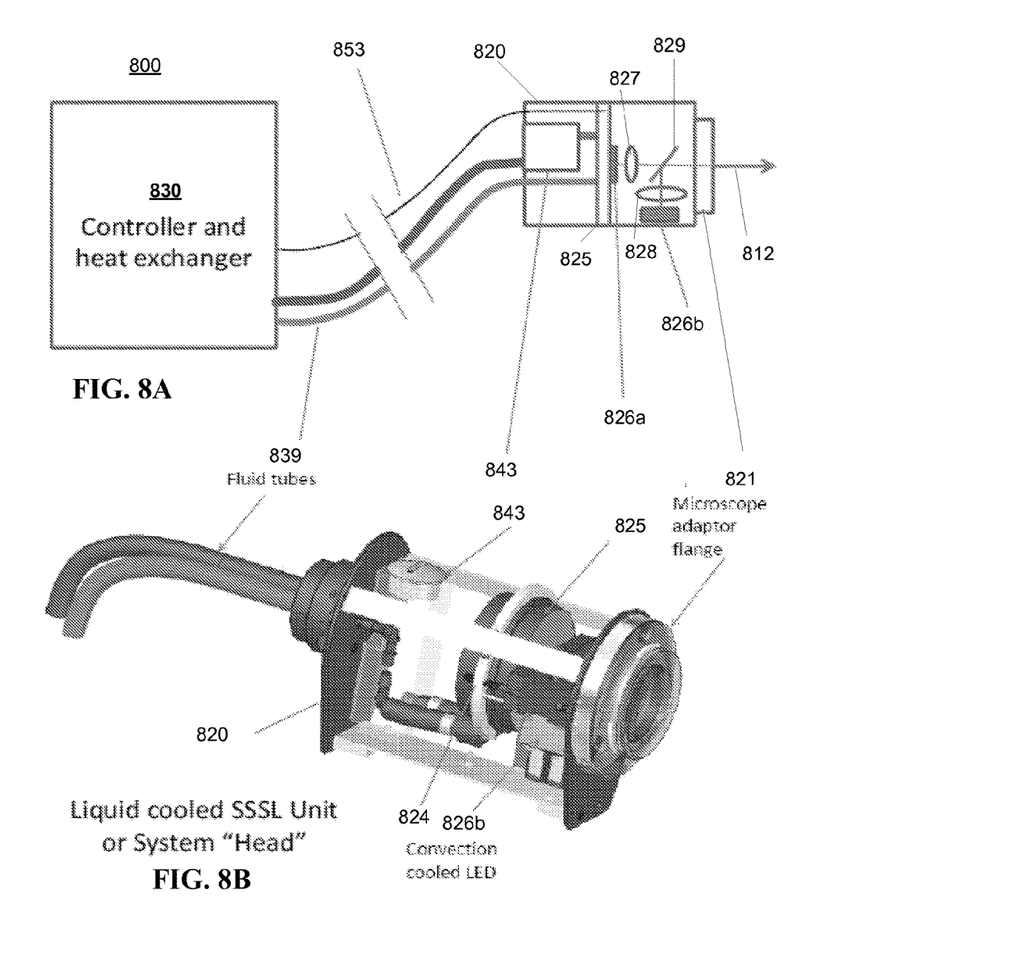
FIG. 8A shows a block diagram of components and FIG. 8B shows a perspective view of internal components of the liquid cooled SSLS unit with the cover of the housing removed.

A microscope illumination system 800, according to a third exemplary embodiment of the invention, is illustrated schematically in FIGS. 8A and 8B. In the third embodiment, the liquid cooled SSLS unit 820 includes a high power LED light source 826a, which is thermally coupled to a liquid cooled cold plate 825 and another LED light source 826b, which is air cooled, (convection cooled), rather than being mounted on a cold plate. The cold plate 825 is fed with liquid coolant by tubing 839 by the closed loop liquid cooling system 830. In this arrangement, the pump unit 824 including the coolant reservoir 843 and pump 844 is housed within the SSLS unit or system "head" 820, and the housing includes a microscope adaptor flange 821. This arrangement provides a lightweight and compact head 820, which is directly mechanically and optically coupled to a microscope illumination port 611 (FIG. 6) by a standard microscope adaptor flange 821. As illustrated, suitable optical coupling elements, such as dichroic beam-splitter/combiner 829 and coupling lenses 827, 828, are used to couple the optical emission from the liquid cooled high power LED light source 826a and the convection cooled LED 826b, along a common optical axis 812, to the optical output. Direct mechanical and optical coupling also facilitates optical alignment of LED light source to provide uniform illumination at the image plane.

As an example, the high power LED light source 826a may be a blue LED combined with a phosphor coating layer, for broadband emission over the visible spectrum. The air cooled, lower power LED light source 826b may, for example, be a narrow band UV LED.

As illustrated in FIG. 8B, the housing of the SSLS unit 820 is compact, and attaches with an adapter flange 821 for a standard microscope illuminator port, which may be, for example, about 2 inches in diameter. The overall length of the housing may be, for example about 5 or 6 inches. The pump 824 and cold plate 825a are mounted in the centre of the housing. About half the length of the housing is occupied by the first LED light source 826a mounted on the cold plate 825a, the second, air cooled, LED light source 826b and the optical components including the coupling lenses 827, 828 and the dichroic combiner/splitter 829. The coolant reservoir 843 and coolant supply 839 from the reservoir 843 to the cold plate 825a, and the coolant return 839 connection, occupy the remaining part of the housing. The fluid reservoir 843 and pump 824 may alternatively be housed in the remote unit 830, for example, to reduce the size of the SSLS unit 820, or to provide space for additional liquid cooled LED light sources and/or air cooled LED light sources, coupling optics, and/or control electronics, within the SSLS unit 820.

As illustrated schematically in FIG. 8A, the remote unit 830 may house other components similar to those illustrated in FIG. 6, such as the heat exchanger 632 (FIG. 6) and fans 631 (FIG. 6), and the electronic components of the controller 650 (FIG. 6) for driving the LED light source 826a, 826b, with an electrical connection 653 (FIG. 6) from the remote unit 830 to the SSLS unit 820.

As will be appreciated, in high power microscopy illumination systems of these embodiments and alternative embodiments, when the liquid cooled SSLS unit includes multiple LED light sources, each high power LED light sources may be thermally coupled to individual cold plates, or more than one LED light source may be mounted on a common cooling block. The cooling plates or blocks may be coupled into the same cooling loop in series or in parallel. Optionally, other LED such as lower power LEDs, which require less cooling may be convection cooled as is conventional. Optionally, electronic control circuitry, such as high current LED drivers may also be placed close to the LED light sources to reduce the length of high current electrical connections and this circuitry may also be thermally mounted on a cooling plate to allow for thermal management.

Performance Evaluation

Early testing has confirmed the advantages of the direct coupled, liquid cooled SSLS unit, compared with conventional LLG coupling of a similar LED light source.

Table 1 shows experimental results comparing operation of an air cooled LED, with LLG coupling of the emission to the microscope illumination port and for direct coupling of the same LED in a liquid cooled SSLS light source unit as illustrated schematically in FIG. 6. Optical power at the objective plane was recorded after transmission through a filter centered at 560 nm with a bandwidth of 25 nm. Measurements were taken at the image plane of a 20×/0.75 objective on a Zeiss Axiovert A1 microscope.

When driving an LED at a particular current density, two factors affect the power delivered through to the microscope objective plane. First, for direct coupling, the optical train contains fewer components, providing for more efficient coupling and reduced losses compared to light guide coupling. Secondly, improved thermal management leads to a more efficient transfer of electrical energy to optical energy.

Thus, for operation at 1.2 A/mm$^2$, these two effects provide a greater than two times improvement in optical power at the objective plane for the directly coupled SSLS unit compared to delivering the light from the same LED light source through a liquid light guide (LLG). Typically there are insertion losses of about 20% to 30% in a liquid light guide, and this loss increases over time as the LLG is exposed to high temperatures and/or light intensity levels. As a result, LLGs must be periodically replaced every 1000-2000 hours, and considerably faster if not properly maintained. Moreover, the higher thermal capacity of the liquid cooling system, relative to air cooling of the LED, allows the LED to be driven at about twice the current density, or higher, while maintaining a similar junction temperature, thereby yielding an additional 1.5 times improvement in the optical output power of the LED. That is, the direct coupled, liquid cooled, SSLS unit system provides an overall improvement of approximately three times or more in the optical power at the objective plane vs. the air cooled LED with LLG coupling.

TABLE 1

Performance comparison

|  | LLG @ 1.2 A/mm$^2$ | Direct @ 1.2 A/mm$^{2Di}$ | Direct @ 2.2 A/mm$^2$ |
| --- | --- | --- | --- |
| Optical Power @ Objective Plane | 18.8 mW | 41.3 mW | 62.6 mW |
| Ratio vs. LLG @ 1.2 A/mm2 | 1.00 | 2.20 | 3.33 |
| Junction Temperature (° C.) | 87 | 62 | 96 |

TABLE 1-continued

Performance comparison

|  | LLG @ 1.2 A/mm$^2$ | Direct @ 1.2 A/mm$^{2Di}$ | Direct @ 2.2 A/mm$^2$ |
| --- | --- | --- | --- |
| Electrical Power (W) | 41 | 41 | 79 |

Figure 9:
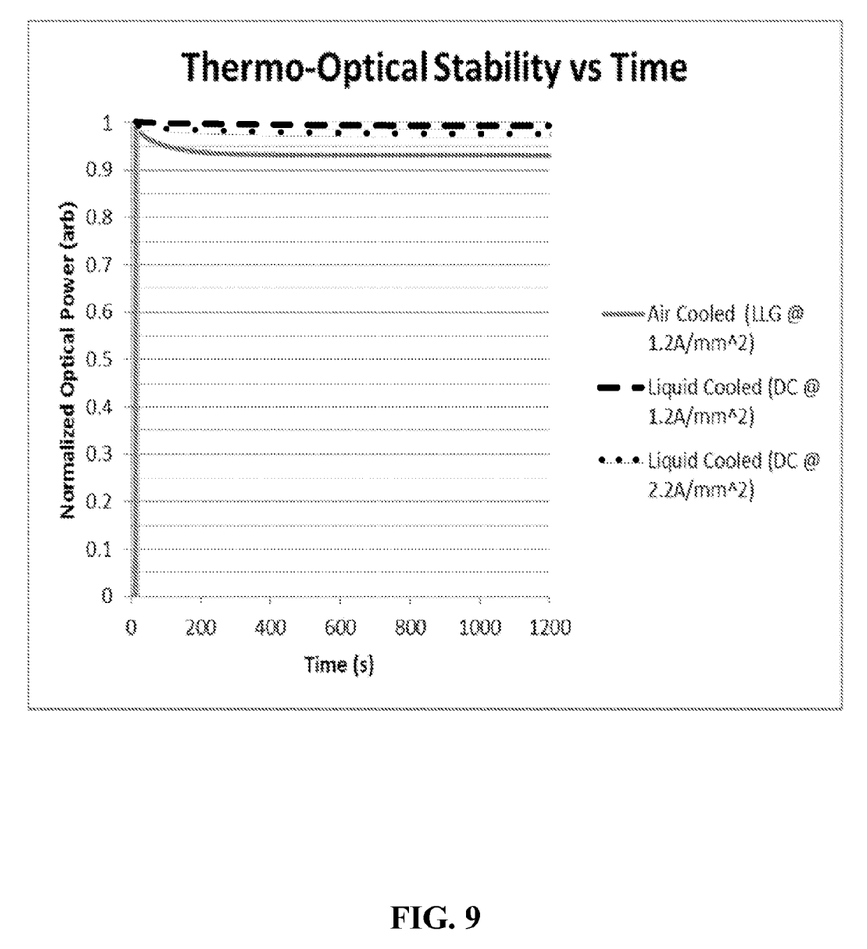
FIG. 9 shows a plot of the normalized optical output power vs. time for an air cooled LLG coupled LED light source operating at 1.2 A/mm$^2$; a liquid cooled LED light source operating at 1.2 A/mm$^2$; and a liquid cooled LED light source operating at 2.2 A/mm$^2$.
Figure 10:
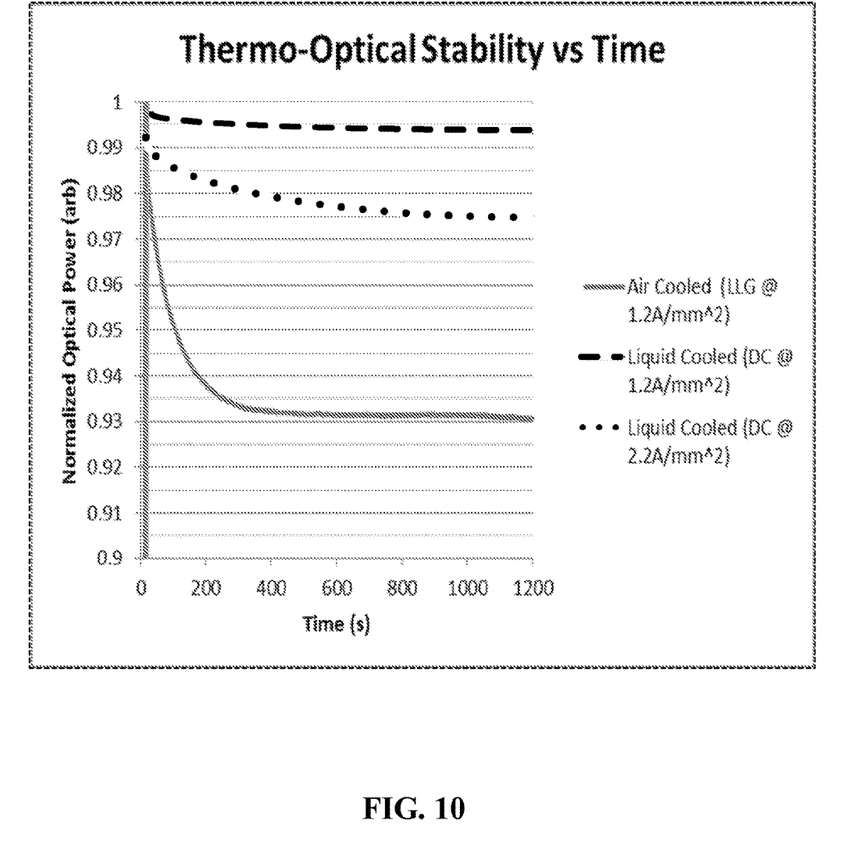
FIG. 10 shows an expanded view of the upper range of the y-axis (normalized output power) of the plots of FIG. 8, showing the normalized optical output power vs. time for an air cooled LLG coupled LED light source operating at 1.2 A/mm$^2$; a liquid cooled LED light source operating at 1.2 A/mm$^2$; and a liquid cooled LED light source operating at 2.2 A/mm$^2$.

Data shown in FIGS. 9 and 10 illustrate the difference between a forced air cooled system driven at 1.2 A/mm$^2$ (solid line), a closed-loop liquid cooled system driven at the same drive current (dashed line), and a closed-loop liquid cooled system driven at 2.2 A/mm$^2$ (dotted line). FIG. 9 shows the optical output power on a scale from 0-100%, while FIG. 10 shows the same data with the Y-axis in the range from 90-100% expanded. The power drop from an overdriven liquid cooled LED (dotted line) is approximately 3 times less than the power drop from an air-cooled system (solid line). This is significant, considering that the LED is being driven at almost twice the current density. When comparing with the LED at the same current density, the improvement is almost 7 times and the LED has stabilized to within 1%, almost immediately. As shown in FIG. 9, dashed line, for the liquid cooled LED driven at 1.2 A/mm$^2$, there is a small overshoot when the liquid cooled LED is first turned on and heats up, but this transient would typically last for a fraction of a second and the LED becomes almost immediately stable to within 1%. This stability is as good as the best lamp based systems can achieve. As shown in the dotted line, when the liquid cooled LED is overdriven at 2.2 A/mm$^2$, there is a slower thermal time constant in effect, and thus the system would take a few tens of seconds to stabilize to within +/−1%. Nevertheless, this performance is still significantly better than the air cooled LED, solid line, which takes about 150 s to 200 s to stabilize. By comparison, a lamp based system typically takes over 5 minutes to stabilize.

Thus, high power microscopy illumination systems according to embodiments of the invention described herein provide a compact lightweight SSLS unit with efficient liquid cooling to enable operation of LED light sources at high current density, while maintaining excellent thermo-optical stability. The SSLS unit is directly mechanically coupled to a microscope illuminator port enabling direct optical coupling of the LED light sources to the microscope. Mechanical coupling is provided using a standard microscope adaptor flange without need for additional support structures. By separating the SSLS unit from the remote unit housing vibration causing components, such as fans, and providing vibration isolation between the units, minimal, if any, vibrations are transmitted to the microscope.

While specific embodiments of the invention have been described by way of example, it will be apparent that liquid cooled SSLS units for microscopy illumination systems according to alternative embodiments may include other arrangements of solid state light sources. For example, copending U.S. patent application Ser. No. 13/897,237 filed 17 May 2013, entitled "High Brightness Solid State Illumination System for Fluorescence Imaging and Analysis" discloses a system that utilizes laser optical pumping of a phosphor layer of a phosphor coated LED light source to boost emission in spectral regions where there is a lack of semiconductors with an appropriate band-gap, such as the green/yellow spectral regions. It will be apparent that in such a system, the LED light source may be mounted on a cold plate and a closed loop liquid cooling system may be provided for cooling the LED light source, similar to the arrangement shown in FIG. 7, to enable the LED light sources to be driven at higher current density. A similar methodology may be used for thermal management of the high brightness light source including a laser pumped wavelength conversion element which is disclosed in copending U.S. patent application Ser. No. 13/900,089 filed 22 May 2013, entitled "High Brightness Illumination System and Wavelength Conversion Module for Microscopy and Other Applications."

Although embodiments of the invention have been described and illustrated in detail, it is to be clearly understood that the same is by way of illustration and example only and not to be taken by way of limitation, the scope of the present invention being limited only by the claims.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A high power microscopy illumination system comprising:
   a liquid cooled solid state light source (SSLS) unit for direct mechanical and optical coupling to an illuminator port of a microscope, the SSLS unit comprising an LED light source thermally coupled to a liquid cooled plate of a closed loop liquid cooling system and optical elements for optical coupling of optical emission from the LED light source along an optical axis of the SSLS unit to an optical aperture of the illuminator port;
   an electronic controller comprising an LED driver electrically connected to the LED light source for driving the LED light source;
   a unit remote from the SSLS unit comprising a heat exchanger of the closed loop liquid cooling system;
   liquid coolant couplings between the heat exchanger and the liquid cooled plate forming a closed loop for circulation of liquid coolant and a pump for circulating coolant liquid in the closed loop; and
   the SSLS unit being vibrationally isolated from the remote unit,
   wherein the LED driver is configured to overdrive the LED light source at high current density, and wherein the controller is configured to monitor an operational temperature of the LED light source and to activate the pump for liquid cooling of the LED light source when overdriving the LED light source at high current density, to maintain an operational temperature of the LED below a threshold value for thermo-optical stability.

2. The illumination system of claim 1 wherein vibration causing components of the heat exchanger are housed in the remote unit and the liquid coolant couplings to the SSLS unit comprise flexible tubing providing vibration isolation from the remote unit.

3. The illumination system of claim 1 wherein the SSLS unit comprises a microscope adaptor flange configured to mechanically couple the SSLS unit to the microscope illuminator port.

4. The illumination system of claim 1 wherein the SSLS unit further comprises one or more additional LED light sources, each thermally coupled to a respective liquid cooled plate of the closed loop cooling system and wherein optical components couple optical emission from at least one or more additional LED light sources to the optical axis of the SSLS unit, and wherein the controller provides for monitoring operational temperatures of each of the LED light sources and activating liquid cooling of the LED light sources to maintain a required operational temperature of each LED light source.

5. The illumination system of claim 1 wherein the SSLS unit further comprises a second LED light source, which is air cooled and not liquid cooled, and wherein optical components couple optical emission from the second LED light source to the optical axis.

6. The illumination system of claim 1 wherein the LED driver circuitry is thermally coupled to a liquid cooled plate of the closed loop liquid cooling system.

7. The illumination system of claim 1 wherein the LED driver is housed within the SSLS unit in proximity to the LED light source, and the LED driver is thermally coupled to a liquid cooled plate of the closed loop liquid cooling system for cooling of the LED driver circuitry during overdriving the LED light source at high current density.

8. The illumination system of claim 1 wherein the system further comprises a coolant reservoir and the pump and the reservoir are housed in the remote unit.

9. The illumination system of claim 1 wherein the system further comprises a coolant reservoir and wherein the pump and the coolant reservoir are housed in the SSLS unit.

10. The illumination system of claim 1 wherein the controller is configured to drive the LED light source at a current density in the range from $0.02$ A/mm$^2$ to greater than $2$ A/mm$^2$ and wherein the liquid cooling system is configured to provide cooling capacity for maintaining an operational temperature (junction temperature) of the LED light source at or below 95° C. for extended lifetime operation and for maintaining stability of the optical power output within ±1%.

11. The illumination system of claim 1 wherein the liquid coolant couplings between the heat exchanger of the remote unit and the liquid cooled plate of the SSLS unit are about 1.5 m to 2 m long.

12. A high power microscopy illumination system comprising:
   a liquid cooled solid state light source (SSLS) unit for direct mechanical and optical coupling to an illuminator port of a microscope, the SSLS unit comprising an LED light source thermally coupled to a liquid cooled plate of a closed loop liquid cooling system and optical elements for optical coupling of optical emission from the LED light source along an optical axis of the SSLS unit to an optical aperture of the illuminator port, the closed loop liquid cooling system including a coolant reservoir and a pump for circulating coolant liquid in the closed loop, the coolant reservoir and pump being housed in the SSLS unit;
   an electronic controller comprising an LED driver electrically connected to the LED light source for driving the LED light source at high current density;
   a unit remote from the SSLS unit comprising a heat exchanger of the closed loop liquid cooling system;
   flexible liquid coolant couplings between the heat exchanger and the liquid cooled plate for circulation of liquid in the closed loop liquid cooling system; and
   the SSLS unit being vibrationally isolated from the remote unit.

13. A high power microscopy illumination system comprising:
   a liquid cooled solid state light source (SSLS) unit for direct mechanical and optical coupling to an illuminator port of a microscope, the SSLS unit comprising an LED light source thermally coupled to a liquid cooled plate of a closed loop liquid cooling system and optical elements for optical coupling of optical emission from the LED light source along an optical axis of the SSLS unit to an optical aperture of the illuminator port;

an electronic controller comprising an LED driver electrically connected to the LED light source for driving the LED light source, the LED driver configured to overdrive the LED light source at high current density;

a unit remote from the SSLS unit comprising a heat exchanger of the closed loop liquid cooling system;

liquid coolant couplings between the heat exchanger and the liquid cooled plate forming a closed loop for circulation of liquid coolant and a pump for circulating coolant liquid in the closed loop; and the SSLS unit being vibrationally isolated from the remote unit, wherein the controller is configured to monitor an operational temperature of the LED light source and to activate the pump for liquid cooling of the LED light source when driving the LED light source at high current density, to maintain an operational temperature of the LED below a threshold value for thermo-optical stability, wherein vibration causing components of the heat exchanger are housed in the remote unit and the liquid coolant couplings to the SSLS unit comprise flexible tubing providing vibration isolation from the remote unit, and wherein the SSLS unit comprises a microscope adaptor flange configured to mechanically couple the SSLS unit to the microscope illuminator port.

14. The illumination system of claim 1 wherein the SSLS unit further comprises a second LED light source thermally coupled to second liquid cooled plate of the closed loop cooling system and wherein optical components couple optical emission from the second LED light source to the optical axis of the SSLS unit.

15. The illumination system of claim 14 wherein said LED light source comprises a high power LED light source and the second LED light source comprises a lower power LED light source, and wherein the liquid cooled plates are coupled in series with coolant flow being directed first through the second cold plate.

16. A high power microscopy illumination system comprising:

a liquid cooled solid state light source (SSLS) unit for direct mechanical and optical coupling to an illuminator port of a microscope, the SSLS unit comprising an LED light source thermally coupled to a liquid cooled plate of a closed loop liquid cooling system and optical elements for optical coupling of optical emission from the LED light source along an optical axis of the SSLS unit to an optical aperture of the illuminator port;

an electronic controller comprising an LED driver electrically connected to the LED light source for driving the LED light source, the LED driver configured to overdrive the LED light source at high current density;

a unit remote from the SSLS unit comprising a heat exchanger of the closed loop liquid cooling system;

liquid coolant couplings between the heat exchanger and the liquid cooled plate forming a closed loop for circulation of liquid coolant and a pump for circulating coolant liquid in the closed loop; and the SSLS unit being vibrationally isolated from the remote unit, wherein the controller is configured to monitor an operational temperature of the LED light source and to activate the pump for liquid cooling of the LED light source when driving the LED light source at high current density, to maintain an operational temperature of the LED below a threshold value for thermo-optical stability.

17. The high power microscopy illumination system of claim 16, wherein vibration causing components of the heat exchanger are housed in the remote unit and the liquid coolant couplings to the SSLS unit comprise flexible tubing providing vibration isolation from the remote unit, and wherein the SSLS unit comprises a microscope adaptor flange configured to mechanically couple the SSLS unit to the microscope illuminator port.

18. The high power microscopy illumination system of claim 16, wherein the driver is configured to overdrive the LED light source at a high current density of 1.5 A/mm$^2$ to 2 A/mm$^2$ or greater, and wherein the controller is configured to maintain an operational junction temperature of the LED light source at or below 95° C.

* * * * *